United States Patent
Werner et al.

(10) Patent No.: US 11,228,636 B2
(45) Date of Patent: Jan. 18, 2022

(54) METHOD, COMPUTER PROGRAM AND SYSTEM FOR TRANSFERRING A FILE

(71) Applicant: WAGO Verwaltungsgesellschaft mbH, Minden (DE)

(72) Inventors: Falk Werner, Minden (DE); Marius Hellmeier, Lemgo (DE); Stefanie Meihoefer, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 200 days.

(21) Appl. No.: 16/215,133

(22) Filed: Dec. 10, 2018

(65) Prior Publication Data
US 2019/0116221 A1 Apr. 18, 2019

Related U.S. Application Data

(63) Continuation of application No. PCT/EP2017/064005, filed on Jun. 8, 2017.

(30) Foreign Application Priority Data

Jun. 10, 2016 (DE) .......................... 102016110729.8

(51) Int. Cl.
*H04L 29/08* (2006.01)
*G06F 16/17* (2019.01)
(Continued)

(52) U.S. Cl.
CPC .............. *H04L 67/06* (2013.01); *G06F 16/13* (2019.01); *G06F 16/17* (2019.01);
(Continued)

(58) Field of Classification Search
CPC ......... H04L 67/06; H04L 67/02; G06F 16/13; G06F 16/17; G06F 16/1724
See application file for complete search history.

(56) References Cited

U.S. PATENT DOCUMENTS

| 10,530,897 B2 * | 1/2020 | Gotz ........................ H04L 67/42 |
| 2009/0210814 A1 * | 8/2009 | Agrusa ................. G06T 11/206 |
| | | 715/772 |

(Continued)

FOREIGN PATENT DOCUMENTS

EP 2996307 A1 3/2016

OTHER PUBLICATIONS

International Search Report dated Aug. 8, 2017 in corresponding application PCT/EP2017/064005.
(Continued)

*Primary Examiner* — Nam T Tran
(74) *Attorney, Agent, or Firm* — Muncy, Geissler, Olds & Lowe, P.C.

(57) ABSTRACT

A method for transferring a digital file from an OPC VA server to an OPC VA client that is executed in a web browser as a web application, wherein an OPC VA file module is used to open the desired file on the OPC VA server, the digital data included therein are read using the OPC VA communication protocol and subsequently the open file is closed again. From the read digital data, a file is then formed that is a copy of the file to be transferred, the file formed then being provided to the web browser of the client as a file download.

14 Claims, 4 Drawing Sheets

(51) Int. Cl.
*G06F 16/13* (2019.01)
*H04L 29/06* (2006.01)

(52) U.S. Cl.
CPC ......... *G06F 16/1724* (2019.01); *H04L 67/02* (2013.01); *H04L 67/42* (2013.01)

(56) References Cited

U.S. PATENT DOCUMENTS

| | | | |
|---|---|---|---|
| 2010/0011435 A1* | 1/2010 | Wee | H04L 67/06 726/15 |
| 2012/0179731 A1 | 7/2012 | Lin et al. | |
| 2012/0215811 A1 | 8/2012 | Tipper et al. | |
| 2013/0212227 A1* | 8/2013 | Thomas | H04L 67/02 709/219 |
| 2014/0359423 A1 | 12/2014 | Doan et al. | |
| 2015/0058925 A1* | 2/2015 | Curry | H04L 63/08 726/3 |
| 2016/0073443 A1* | 3/2016 | Deiretsbacher | H04L 67/26 370/328 |

OTHER PUBLICATIONS

International Preliminary Report on Patentability dated Dec. 11, 2018 in corresponding application PCT/EP2017/064005.

* cited by examiner

METHOD, COMPUTER PROGRAM AND SYSTEM FOR TRANSFERRING A FILE

This nonprovisional application is a continuation of International Application No. PCT/EP2017/064005, which was filed on Jun. 8, 2017, and which claims priority to German Patent Application No. 10 2016 110 729.8, which was filed in Germany on Jun. 10, 2016, and which are both herein incorporated by reference.

BACKGROUND OF THE INVENTION

Field of the Invention

The present invention relates to a method for transferring a digital file from a first electronic data processing installation, on which an OPC UA server is executed, to a second electronic data processing installation, which is connected to the first electronic data processing installation via a communication network and on which an OPC UA client is executed in a web browser as a web application. The invention likewise relates to a computer program and a system therefor.

Description of the Background Art

In automation engineering, the applicable technical processes are regulated by means of sensors, actuators and controllers. In this instance, the data produced by the sensors are transferred to the controller via a communication system, which is for the most part proprietary, and are evaluated, and the evaluation is then taken as a basis for producing appropriate data that are output to the actuators so as to be able to control the process. The process data arising during this are in this instance not uncommonly represented graphically in a control center in order to be able to ensure monitoring of the entire process that is supposed to be regulated and controlled by the automation by trained personnel.

To achieve preferably standardized communication for the automation system data processing installation involved in the automation, the OPC (Open Platform Communications) communication protocol was developed, the current generation of which is called OPC UA (OPC Unified Architecture). By means of this protocol, it is in particular possible to store the process data arising in an automation process in structured fashion and to provide them to a control center for monitoring.

An OPC UA server is normally configured for this, which is connected to the field devices of the automation line via a communication network, for example a data bus. This allows the OPC UA server to pick off the process data arising during the automation by the automation system and to store them in a logical structure.

On the other hand, the OPC UA server is connected via a for the most part standardized communication network (for example based on TCP IP) to an OPC UA client that can access the OPC UA server via the communication network by using the OPC UA communication protocol and can read the process data stored on said OPC UA server and can represent them graphically in the control center. This allows the process data of the automation to be accessed in standardized fashion from a control center and therefore allows the entire automation process to be monitored.

To achieve further abstraction and platform independence at the client end, such an OPC UA client is normally implemented as a web application in practice but runs using a web browser executable on the client computer. On the basis of a web protocol, for example HTTP, the OPC UA server, which has a web server connected upstream of it in the communication chain, is then accessed from the web browser of the client computer in order to be able to interpret the requests of the web client as appropriate and to forward them to the OPC UA server. The OPC UA communication using the OPC UA communication protocol is effected at application level in this case.

Not uncommonly, there is the requirement for entire files of the OPC UA server to be transferred to the client computer, for example for the purpose of data backup or for the purpose of error analysis. Since the OPC UA standard is intended principally for digital storage and the provision of process data an automation, however, the OPC UA communication standard has no means of transferring complete files from the OPC UA server to the client computer on the basis of the OPC UA communication standard. This problem is aggravated when the implementation of the OPC UA client as a web application means that direct access to the OPC UA server is possibly only indirectly via the web protocol and hence direct access to the files of the OPC UA server at file system level is prevented. Against the background of security, such data encapsulation is admittedly desirable and moreover also for the most part required. However, the defect within the OPC UA standard means that administrative activities relating to the OPC UA server are hampered, which can have distinctly negative effects in practice.

SUMMARY OF THE INVENTION

It is therefore an object of the present invention to provide an improved method and an improved system that, despite limited access to the OPC UA server by means of an OPC UA client implemented as a web application, render the complete transfer of entire files from the OPC UA server to the client possible without having to alter the security architecture of the whole installation in the process.

In an exemplary embodiment, a method for transferring a digital file from a first electronic data processing installation, on which an OPC UA server is executed, to a second electronic data processing installation, which is connected to the first electronic data processing installation via a communication network and on which an OPC UA client is executed, is provided. The first electronic data processing installation, on which an OPC UA server is executed, is the server end in this instance, while the second electronic data processing installation, on which the OPC UA client is executed, is the client end.

The OPC UA client can be, in this instance, executed in a web browser in the form of a web application. A web application can be understood to mean, for example, an application program that, for execution, needs a web browser installed and executed on the second electronic data processing installation. The web application normally communicates with a web server installed and executed on the server on the basis of the HTTP protocol in this instance, which means that communication between client and server becomes possible. The web application can in this instance be executed on any client-end data processing installation independently of platform, provided that an appropriate web browser is installed at the client end.

If the server end has provision for a web server on the first electronic data processing installation, said web server is communicatively connected to the OPC UA server executed on the first electronic data processing installation, so that a communication link between the OPC UA client and the OPC UA server can be set up by using the OPC UA communication protocol or OPC UA communication standard, the transport protocol used in this instance being the HTTP protocol on which the web browser and the web server are based. In the case of an Ethernet communication network or Ethernet communication link between the first and second electronic data processing installation, the HTTP communication messages are transferred on the basis of the TCP IP communication protocol on which Ethernet standard is based. The Ethernet communication protocol with the TCP IP communication protocol is in this instance the network protocol on which the communication network is based.

According to the invention, there is provision for an OPC UA file module that, as will be explained below, can be provided at the client or server end and controls transfer of the anticipated file. In this regard, the OPC UA file module opens the file anticipated for transfer by means of the OPC UA server (for example on the first electronic data processing installation or on the OPC UA server) by using the OPC UA communication protocol, the file anticipated for transfer being available to the OPC UA server. The term "open" within the context of the present invention, in relation to digital files, means the aspect that there can be read and/or write access to the file and hence at least read access by the OPC UA server to the file preferably stored in the file system of the first electronic data processing installation is enabled. Ultimately, the opening of the file anticipated for transfer by means of the OPC UA server provides the authorization to effect at least read access to the content of the file, i.e. the digital data of the file. Such access to the content of an unopened file is for the most part not possible.

After the file anticipated for transfer is opened by means of the OPC UA server, the digital data representing the content of the file anticipated for transfer are then likewise read by using the OPC UA communication protocol. The data are in this instance read either into the OPC UA file module itself or, as will be shown in one embodiment, initially into the OPC UA client, depending on the installation location of the OPC UA file module.

Since the OPC UA communication protocol allows access to the file and the content thereof only to a limited extent, the content of the file is read sequentially. Complete transfer of the file without opening is not supported by the OPC UA communication protocol in this instance, which means that the data can be transferred only by reading the content of the file.

Advantageously, after the file opened by means of the OPC UA server has been read completely, the file is closed by using the OPC UA communication protocol by means of the OPC UA server, which means that further authorization to effect read and/or write access to the content of the file is removed.

The digital data read from the file in this manner are now used to form a file that is a copy of the file anticipated for transfer, and said file is provided to the web browser of the second electronic data processing installation as a file download. Provision of the file as a file download in the web browser allows the file copied and transferred in this manner to be downloaded onto the second electronic data processing installation and stored on the file system there.

This allows a file available to the OPC UA server (for example deposited in the file structure of the first electronic data processing installation and stored in encapsulated fashion there) to be filed by means of the OPC UA communication protocol in the file system of that electronic data processing installation on which the OPC UA client runs as a web application. Despite the absence of a way of downloading entire files onto the client machine of the OPC UA client by means of the OPC UA server within the OPC UA communication protocol, since the security architecture means that direct access from the client end to the file of the OPC UA sever or to the file system of the first electronic data processing installation is not possible, said file can nevertheless be downloaded by means of the present invention into the file system of the client machine (second electronic data processing installation) and stored there without impairing the security architecture of the client/server installation.

A file within the context of the present invention is understood to mean a logical digital data container that is stored within the file system of the first electronic data processing installation and is referenceable by means of its name and memory location.

An electronic data processing installation is understood to mean in particular a digital computing machine that is designed to execute computer programs, in particular to execute an OPC UA server and/or a web browser or web server. This can be a microprocessor-controlled computer, for example.

A copy of a file can be understood to mean a complete duplicate of the file to be transferred in terms of the readable digital data. In particular, the n-th bits of the copy and the original are identical.

The present invention therefore provides the possibility of transferring and storing a file completely from the file system of a first data processing installation, on which an OPC UA server runs, to the file system of a second data processing installation, on which an OPC UA client runs as a web application, without having direct access to the file system of the first data processing installation, but rather just using the OPC UA server.

The file download can be provided to the web browser by the OPC UA file module by using the HTTP or FTP communication protocol, which means that the standardized communication interfaces of the web browser can be used for the file download.

The digital data of the opened file can be read in blocks by using the OPC UA communication protocol, the block size being consistent with a prescribed number of bytes. The OPC UA communication protocol only allows a file content to be read in a size-restricted form on the basis of the OPC UA standard, which means that files larger than this permissible maximum value cannot be read completely and as a whole. Thus, the digital data of the file are accessed and read in blocks so as to be able to read the whole content of the file despite the size restriction of the OPC UA standard.

In a further advantageous embodiment, there is provision for the OPC UA file module is on the second electronic data processing installation, i.e. at the client end, and it is also provided there. In this instance, the file anticipated for transfer is opened by the OPC UA file module from the second electronic data processing installation by using the OPC UA communication protocol via the communication network on the basis of the network protocol on which the communication network is based by means of the OPC UA server of the first electronic data processing installation (for example on the first electronic data processing installation or on the OPC UA server). After the file is opened, the digital data of the opened file, i.e. the file content, are read by the OPC UA file module by using the OPC UA communication protocol and are transferred from the OPC UA server of the first electronic data processing installation to the second electronic data processing installation via the communication network on the basis of the network protocol on which the communication network is based by using the OPC UA communication protocol. The recipient of these read digital data can in this instance be either the OPC UA file module or the OPC UA client executed as a web application in the web browser, which OPC UA client buffer-stores the read digital data for the OPC UA file module.

Advantageously, after the digital data are read, the opened file is closed by the OPC UA file module from the second electronic data processing installation by means of the OPC UA server (in an equivalent manner to the opening of the file).

A file that is a copy of the file to be transferred on the OPC UA server is then formed from the read and transferred digital data that are now on the second electronic data processing installation by means of the OPC UA file module, which file is then provided to the web browser of the second electronic data processing installation as a file download.

In this embodiment, the OPC UA file module for downloading a file from the OPC UA server is at the client end, which means that intervention in the architecture and structure of the first electronic data processing installation with the OPC UA server does not become necessary.

In this case, the OPC UA file module can be part of the OPC UA client of the second electronic data processing installation that is executed in the web browser as a web application, which means that the OPC UA file module is likewise executed as a web application in the web browser.

Alternatively, however, it is also possible for the OPC UA file module to be part of the web browser within which the OPC UA client is executed as a web application. In this embodiment, the OPC UA file module is, by way of example, a supplementary program for the web browser (also called a plugin) that is connected to the OPC UA client embodied as a web application in the web browser via an OPC UA interface and can communication with said OPC UA client so as to download the requested file from the OPC UA server by using the OPC UA communication protocol. For this, the OPC UA file module implemented in the web browser can use the interface to access the functionality of the OPC UA communication protocol or standard of the OPC UA client so as to use the OPC UA communication protocol for downloading the file, for example via the OPC UA client.

In this embodiment, adaptation of the OPC UA client is not needed, but rather just adaptation of the web browser by means of an additional program module.

In a further alternative or additional embodiment, the OPC UA file module can be located on the first electronic data processing installation, i.e. on the server, and is installed and provided there. In this instance, a transfer request is sent from the OPC UA client of the second electronic data processing installation to the OPC UA file module of the first electronic data processing installation via the communication network and is received by said OPC UA file module. On the basis of the received transfer request, the file anticipated for transfer is opened by the OPC UA file module on the first electronic data processing installation by using the OPC UA communication protocol by means of the OPC UA server (for example on the first electronic data processing installation or on the OPC UA server). Subsequently, the digital data of the opened file are read by the OPC UA file module by using the OPC UA communication protocol and are buffer-stored in the OPC UA file module of the first electronic data processing installation. Advantageously, after the digital data are read, the opened file is closed again by the OPC UA file module.

The OPC UA file module forms a file from the read and buffer-stored data that is a copy of the file to be transferred and is provided to the web browser of the second electronic data processing installation via the communication network as a file download on the basis of the network protocol on which the communication network is based. From the web browser, the file thus provided comprising the read digital data can then be physically transferred via the communication network and filed thereon in the file system of the second electronic data processing installation.

The file formed by the OPC UA file module can be provided as a file download to the web browser of the second electronic data processing installation via HTTP or FTP in this instance.

In this case, it is very particularly advantageous if the OPC UA file module of the first electronic data processing installation contains an OPC UA client for accessing the OPC UA server by using the OPC UA communication protocol and implements such an OPC UA client, which means that it is possible to resort to the OPC UA databases already present on the OPC UA server.

The memory location of a file provided and stored as a file download in the file system of the second electronic data processing installation is in this instance provided for separately from the memory location of a possibly provided for buffer store for the read digital data and the memory location of buffer-stored data for operating the web browser and the web application (also called a cache).

The object is otherwise also achieved by means of a computer program, wherein the computer program has program code configured to perform the method described above when the computer program is executed as an OPC UA file module on the first and/or the second electronic data processing installation.

The object is also achieved according to the invention by a system, wherein the system or communication system has a first electronic data processing installation and a second electronic data processing installation connected to one another by means of a communication network. The communication network can be an Ethernet, for example, which can be used to transfer data on the basis of the TCP IP protocol. The first electronic data processing installation has an OPC UA server installed on it that can be accessed by means of an OPC UA client executed on the second electronic data processing installation. The system, which can be part of an automation system or of an automation, for example, is configured such that it can perform the method cited above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
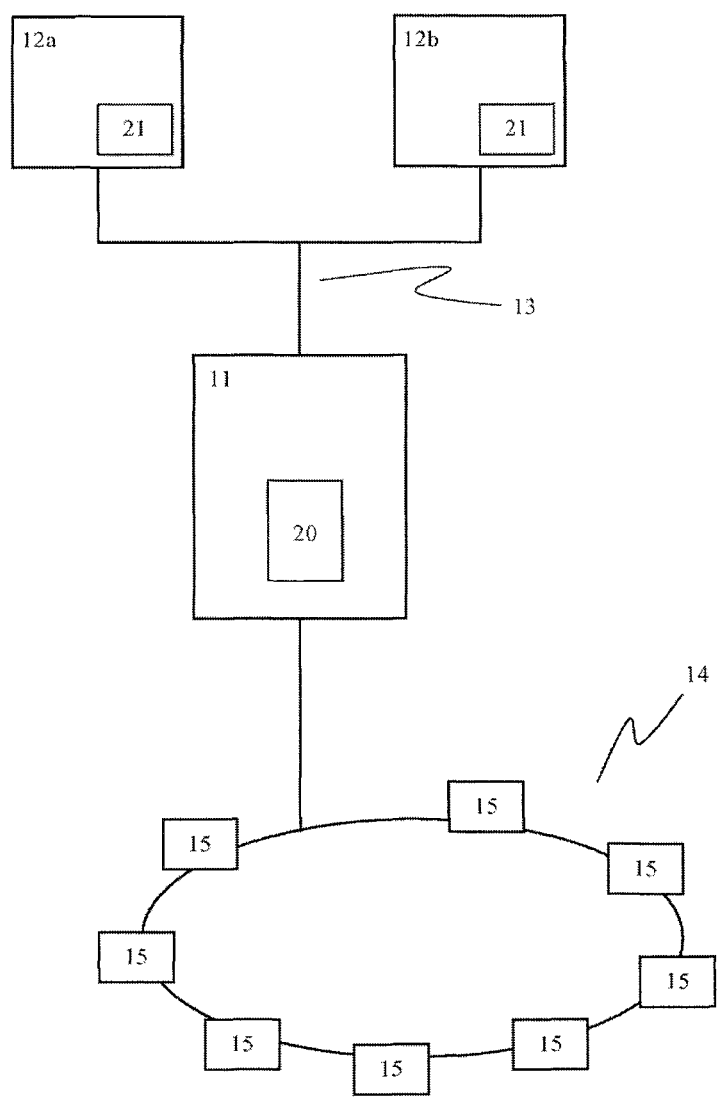
FIG. 1 shows a schematic depiction of the communication system.

FIG. 1 schematically shows a system or communication system 10 that has a first electronic data processing installation 11 and two second electronic data processing installations 12a and 12b. The first electronic data processing installation 11 and the two second electronic data processing installations 12a and 12b are communicatively connected to one another via a communication network 13, which means that data can be interchanged between the data processing installations via the communication network 13. Such a communication network 13 can be an Ethernet-based communication network, for example, in which the data can be interchanged on the basis of the TCP IP protocol.

The first electronic data processing installation 11 is furthermore connected to an automation network 14, which controls or performs an automation process, for example, in the example shown in FIG. 1. The automation network has a plurality of subscribers or field devices 15 that are connected to one another by means of the automation network 14. Such field devices 15 can be sensors, actuators and/or control units, for example.

The first electronic data processing installation 11 has an OPC UA server 20 installed on it, which, in the example of FIG. 1, is intended for capturing process data of the automation network 14, for example.

The second electronic data processing installations 12a and 12b, by contrast, each have an OPC UA client 21 configured to access the OPC UA server 20 via the communication network 13 by using the OPC UA communication protocol. This allows the process data of the automation network 14 that are kept by the OPC UA server 20 to be retrieved and displayed by the second electronic data processing installations by using the OPC UA client 21. The second electronic data processing installations 12a and 12b can in this instance be arranged in a control center for monitoring the automation process for which the automation network 14 is intended, for example.

The OPC UA clients 21 of the two second electronic data processing installations 12a and 12b can be implemented in the form of a web application, for example, which are executed in a web browser installed on the second data processing installations 12a and 12b. The HTTP protocol (or an equivalent, comparable web-based protocol) can then be used to access a web server installed on a first electronic data processing installation 11, which web server then undertakes the applicable OPC UA communication with the OPC UA server 20. For this, the instructions of the OPC UA communication standard are encapsulated in an HTTP-based protocol layer and can then be forwarded to the OPC UA server by means of the web server. Web-based communication of this kind can be implemented by means of JavaScript or comparable script languages, for example.

Figure 2:
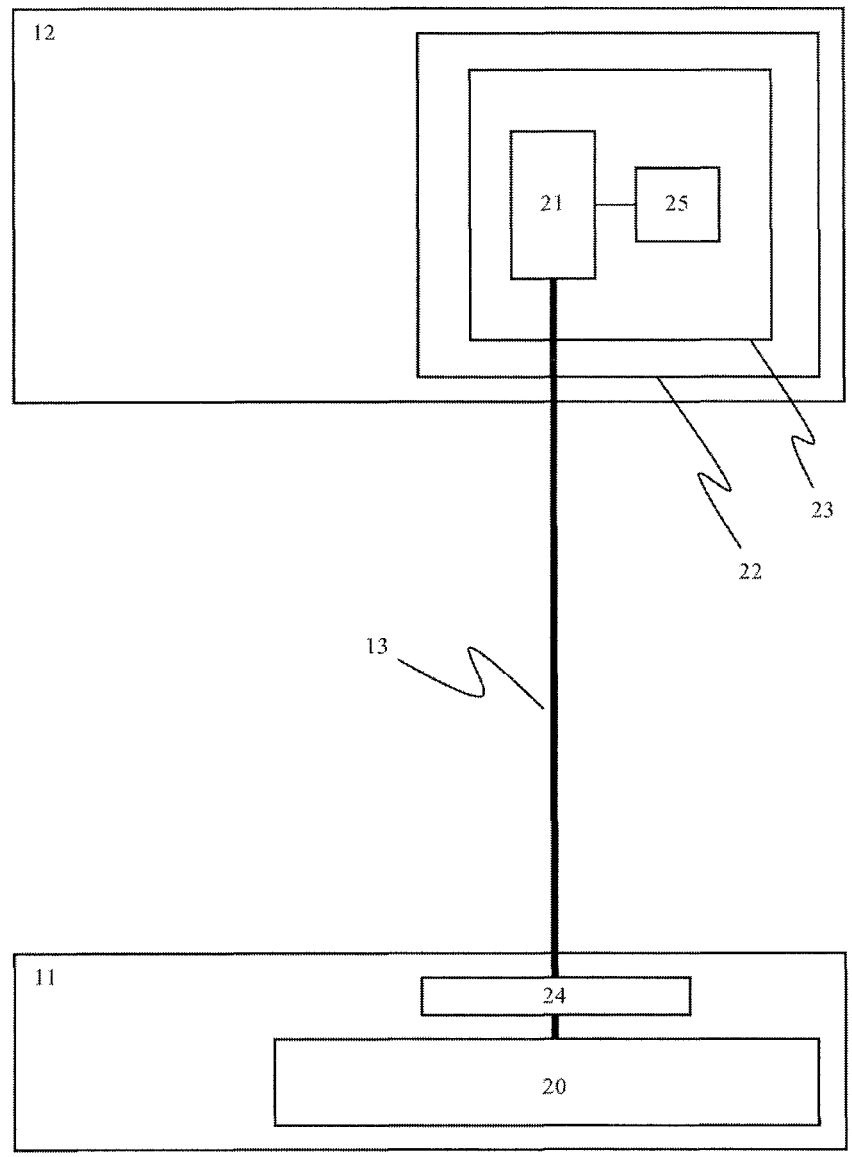
FIG. 2 shows a schematic depiction of an embodiment of the invention.

FIG. 2 shows the inventive concept in an embodiment. Based on the system 10 in FIG. 1, FIG. 2 has provision for a first electronic data processing installation 11 on which an OPC UA server 20 is executed, while the second electronic data processing installation 12 is connected to the first electronic data processing installation 11 via a communication network 13.

The second electronic data processing installation 12 has a web browser 22 installed on it that is designed to execute web applications 23. The web application 23 provided for in the exemplary embodiment of FIG. 2 is an OPC UA client 21 executed as a web application 23 in the web browser 22 of the second electronic data processing installation 12. Via the communication network 13, the web browser 22 and thus finally also the OPC UA client 21 have access to the first electronic data processing installation 11.

The latter furthermore has a web server 24 installed on it that receives the requests and messages coming from the web browser 22 of the second electronic data processing installation 12 (for example in the HTTP protocol using JavaScript) and forwards the instructions of the OPC UA communication protocol that are contained therein to the OPC UA server 20.

According to the invention, the web application 23 provided for is furthermore an OPC UA file module 25, which can be a direct part of the OPC UA client 21, for example. However, it is also conceivable for the OPC UA file module 25 to be a separate web application 23 that can connect to the OPC UA client 21.

Using the OPC UA file module 25, a file intended to be transferred from the first electronic data processing installation 11 to the second electronic data processing installation 12 is then opened in the OPC UA server 20 via the communication network 13 and the digital data that said file contains are read by means of the OPC UA communication protocol via the existing connection of the communication network 13. The digital data that the file to be transferred contains are in this instance transferred on the communication network 13 to the second electronic data processing installation 12, where they are buffer-stored in the OPC UA file module 25, for example, or buffer-stored in the OPC UA client 21. After all the transferred digital data are finished, the file is closed again on the OPC UA server and the OPC UA file module 25 is used to form a file that can then be made available to the web browser 22 as a file download.

Making available or providing a file formed in this way to the web browser 22 as a file download allows the file located on the OPC UA server 20 to be deposited in the file system of the second electronic data processing installation 12 without direct access to the file structure or to the file system of the first electronic data processing installation 11 being necessary.

Figure 3:
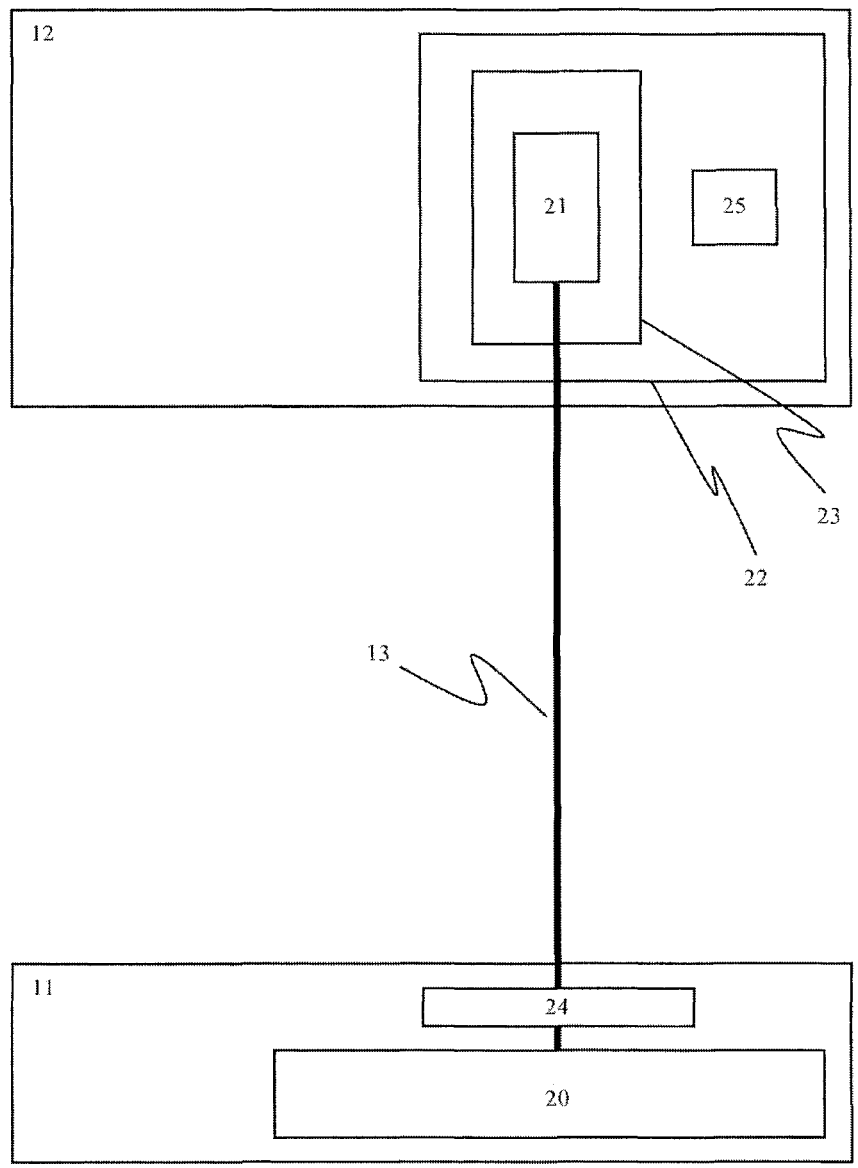
FIG. 3 shows a schematic depiction of an embodiment of the invention.

In the exemplary embodiment of FIG. 3, the OPC UA file module is implemented not as a web application 23 but rather as a program supplement for the web browser 22, which is also referred to as a plugin. This expands the functionality of the web browser 22 by the functionality of the plugin, namely of the OPC UA file module 25.

The OPC UA client 21 in the form of a web application additionally has an interface that the OPC UA file module 25 in the form of a browser expansion for the web browser 22 can access so as to be able to download the file of the OPC UA server 20 onto the second electronic data processing installation 12. After the digital data of the file to be transferred are transferred and an applicable file is formed, said file is then made available to the web browser 22 by means of the browser expansion as OPC UA file module 25.

Figure 4:
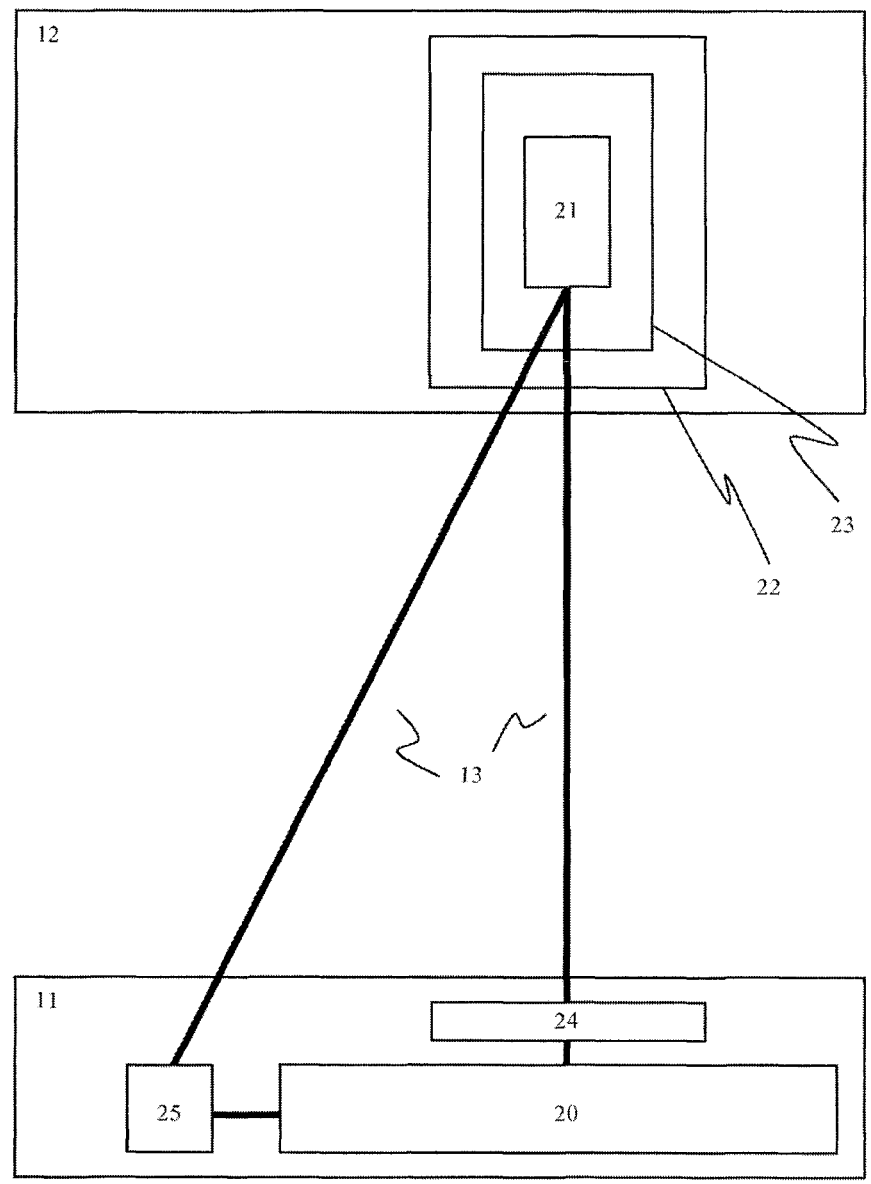
FIG. 4 shows a schematic depiction of an embodiment of the invention.

In the two embodiments of FIG. 2 and FIG. 3, the OPC UA file module is provided for on the client for downloading the file, specifically either in the form of a web application, on the one hand, or in the form of a browser expansion (plugin) for the web browser, on the other hand. In the exemplary embodiment of FIG. 4, the OPC UA file module is provided for on the server and is communicatively connected there to the OPC UA server 20. In this instance, the OPC UA file module 25 itself implements an OPC UA client in order to be able to access the functionality of the OPC UA server 20 as appropriate to the client/s server interface of the OPC UA server 20.

An appropriate request by the web browser 22 or by the OPC UA client 21 at the client end via the communication network 13 signals to the server-end OPC UA file module 25 that transfer of a server file is desired. The OPC UA file module 25 then uses the OPC UA communication protocol to open the requested file on the OPC UA server, reads the digital data that the file contains and subsequently closes the file again. This interaction takes place in this instance via an appropriate client/server interface between the OPC UA server and the OPC UA file module in the form of an OPC UA client.

Subsequently, the read data are used to form a file that is then made available to the web browser 22 of the second electronic data processing installation as a file download. The web browser 22 then downloads this file by means of HTTP or FTP access, for example, and can thus make it available to the second electronic data processing installation 12.

The communication therefor can be effected by means of the web server 24, for example, via which the applicable web resource is then made available.

Alternatively, it is also conceivable for the OPC UA file module to forward the data to the OPC UA client 21, where they are combined to produce a file there and are then made available to the browser as a file download.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A method for transferring a digital file from a first electronic data processing installation, on which an OPC UA server is executed, to a second electronic data processing installation, which is connected to the first electronic data processing installation via a communication network and on which an OPC UA client is executed in a web browser as a web application, wherein the digital file to be transferred is available to the OPC UA server executed on the first electronic data processing installation, the method comprising:
    providing an OPC UA file module;
    opening the digital file, anticipated for transfer, via the OPC UA server over an OPC UA communication protocol;
    reading the digital data that the digital file opened on the OPC UA server contains over the OPC UA communication protocol; and
    forming a new file at the OPC UA client, from the read digital data, that is a copy of the digital file anticipated for transfer on the OPC UA server to the web browser of the second electronic data processing installation as a file download,
    wherein the OPC UA file module is provided on the second electronic data processing installation,
    wherein the digital file anticipated for transfer is opened by the OPC UA file module from the second electronic data processing installation by using the OPC UA communication protocol via the communication network on the basis of the network protocol on which the communication network is based by the OPC UA server of the first electronic data processing installation,
    wherein the digital data of the opened file are read by the OPC UA file module by using the OPC UA communication protocol and are transferred from the OPC UA server of the first electronic data processing installation to the second electronic data processing installation via the communication network on the basis of the network protocol on which the communication network is based by using the OPC UA communication protocol, and
    wherein the new file is formed from the read and transferred digital data by the OPC UA file module and is provided to the web browser of the second electronic data processing installation as the file download.

2. The method as claimed in claim 1, wherein the file opened by the OPC UA server is closed by using the OPC UA communication protocol.

3. The method as claimed in claim 1, wherein the file download is provided to the web browser by the OPC UA file module by using a HTTP or FTP communication protocol.

4. The method as claimed in claim 1, wherein the digital data of the opened file are read in blocks by using the OPC UA communication protocol, the block size being consistent with a prescribed number of bytes.

5. The method as claimed in claim 1, wherein, after the digital data are read, the opened file is closed by the OPC UA file module from the second electronic data processing installation by using the OPC UA communication protocol via the communication network based on the network protocol on which the communication network is based via the OPC UA server of the first electronic data processing installation.

6. The method as claimed in claim 1, wherein the OPC UA file module is part of the OPC UA client of the second electronic data processing installation that is executed in the web browser as a web application.

7. The method as claimed in claim 1, wherein the OPC UA file module is part of the web browser, within which the OPC UA client is executed as a web application of the second electronic data processing installation, wherein the OPC UA file module is connected to the OPC UA client as a web application via an interface and uses the OPC UA communication protocol by accessing the OPC UA client via the interface.

8. A computer readable memory storing a computer program comprising a program code configured to perform the method as claimed in claim 1 when the computer program is executed as an OPC UA file module on the first and/or the second electronic data processing installation.

9. A system comprising:
    a first electronic data processing installation; and
    at least one second electronic data processing installation connected to the first electronic data processing installation via a communication network,
    wherein an OPC UA server is executed on the first electronic data processing installation and an OPC UA client is executed on the second electronic data processing installation in a web browser as a web application, and
    wherein the system performs the method as claimed in claim 1.

10. The method as claimed in claim 1, wherein the OPC UA file module is executed on the first electronic data processing installation and connects to the OPC UA client via the OPC UA communication protocol.

11. A method for transferring a digital file from a first electronic data processing installation, on which an OPC UA server is executed, to a second electronic data processing installation, which is connected to the first electronic data processing installation via a communication network and on which an OPC UA client is executed in a web browser as a web application, wherein the digital file to be transferred is available to the OPC UA server executed on the first electronic data processing installation, the method comprising:

provliding an OPC UA file module;

opening the digital file, anticipated for transfer, via the OPC UA server over an OPC UA communication protocol;

reading the digital data that the digital file opened on the OPC UA server contains over the OPC UA communication protocol; and forming a new file at the OPC UA client, from the read digital data, that is a copy of the digital file anticipated for transfer on the OPC UA server to the web browser of the second electronic data processing installation as a file download, wherein the OPC UA file module is provided on the first electronic data processing installation, wherein a transfer request is sent from the OPC UA client of the second electronic data processing installation to the OPC UA file module of the first electronic data processing installation via the communication network, wherein the received transfer request is taken as a basis for the file anticipated for transfer to be opened by the OPC UA file module by using the OPC UA communication protocol via the OPC UA server of the first electronic data processing installation, wherein the digital data of the opened file are read by the OPC UA file module by using the OPC UA communication protocol and are buffer-stored in the OPC UA file module of the first electronic data processing installation, and wherein a file is formed from the read digital data by the OPC UA file module and is provided to the web browser of the second electronic data processing installation via the communication network as a file download on the basis of the network protocol on which the communication network is based.

12. The method as claimed in claim 11, wherein, after the digital data are read, the opened file is closed by the OPC UA file module by using the OPC UA communication protocol.

13. The method as claimed in claim 11, wherein the OPC UA file module provides the formed file to the web browser of the second electronic data processing installation as a file download via HTTP or FTP.

14. The method as claimed in claim 11, wherein the OPC UA file module of the first electronic data processing installation contains an additional OPC UA client for accessing the OPC UA server by using the OPC UA communication protocol.

* * * * *